(12) United States Patent
Pan et al.

(10) Patent No.: US 9,300,132 B2
(45) Date of Patent: Mar. 29, 2016

(54) MEDIUM VOLTAGE DC COLLECTION SYSTEM

(75) Inventors: Jiuping Pan, Raleigh, NC (US); Hongrae Kim, Cary, NC (US); Jun Li, Raleigh, NC (US); Jing Xu, Cary, NC (US); Jyoti Sastry, Cary, NC (US); Waqas Arshad, Raleigh, NC (US)

(73) Assignee: ABB RESEARCH LTD, Zurich (CH)

( * ) Notice: Subject to any disclaimer, the term of this patent is extended or adjusted under 35 U.S.C. 154(b) by 907 days.

(21) Appl. No.: 13/364,550

(22) Filed: Feb. 2, 2012

(65) Prior Publication Data
US 2013/0200714 A1    Aug. 8, 2013

(51) Int. Cl.
| | |
|---|---|
| H02J 1/10 | (2006.01) |
| H02J 3/38 | (2006.01) |
| H02J 4/00 | (2006.01) |
| H02J 3/36 | (2006.01) |
| H02M 7/483 | (2007.01) |

(52) U.S. Cl.
CPC ............... *H02J 1/102* (2013.01); *H02J 3/386* (2013.01); *H02J 4/00* (2013.01); *H02J 3/36* (2013.01); *H02M 2007/4835* (2013.01); *Y02E 10/763* (2013.01); *Y02E 60/60* (2013.01); *Y10T 307/707* (2015.04)

(58) Field of Classification Search
CPC ............... H02J 1/12; H02J 3/36; H02J 3/38; F03D 9/00; H02P 9/04
USPC .......................................................... 307/82
See application file for complete search history.

(56) References Cited

U.S. PATENT DOCUMENTS

| | | | |
|---|---|---|---|
| 7,633,770 B2 | 12/2009 | Datta et al. | 363/35 |
| 7,863,766 B2 | 1/2011 | Abolhassani et al. | 290/44 |
| 7,880,419 B2 | 2/2011 | Sihler et al. | 318/504 |

(Continued)

FOREIGN PATENT DOCUMENTS

| | | | | |
|---|---|---|---|---|
| EP | 2 341 594 AI | 7/2011 | ............... | H02J 3/36 |
| WO | WO 01/52379 A2 | 7/2001 | ............... | H02J 3/36 |
| WO | WO 2011/033308 A2 | 3/2011 | ............... | H02J 3/36 |

OTHER PUBLICATIONS

S. W. Amos—Newnes Dictionary of Electronics, 4th Edition, Apr. 8, 2002, pp. 227 and 289.*
*Wind Farm Configuration and Energy Efficiency Studies—Series DC versus AC Layouts*; S. Lundberg; PhD Thesis; Chalmers University of Technology, Sweden, 2006.
*DC Connection for Large Scale Wind Farms*; Pan et al.; 9th International Workshop on Large-Scale Integration of Wind Power into Power Systems; Oct. 2010.

(Continued)

*Primary Examiner* — Thienvu Tran
*Assistant Examiner* — David M Stables
(74) *Attorney, Agent, or Firm* — Renner, Kenner, Greive, Bobak, Taylor & Weber

(57) ABSTRACT

A power generation system includes at least one generator having at least two sets of stator windings, an active rectifier comprising power cell based modular converters associated with each set of generator windings. Each set of windings is connected to an AC voltage side of the associated active rectifier, with each active rectifier having a positive DC voltage output and a negative DC voltage output. The DC voltage outputs of active rectifiers are connected to each other in series. A medium voltage DC (MVDC) collection network comprises positive pole cables and negative pole cables, wherein each positive pole cable is connected to the positive DC voltage output of a first active rectifier and each negative pole cable is connected to the negative DC voltage output of a last active rectifier. A substation receives the negative and positive pole cables of the MVDC collection network for further transformation and transmission.

12 Claims, 6 Drawing Sheets

(56) References Cited

U.S. PATENT DOCUMENTS

| | | | | |
|---|---|---|---|---|
| 7,969,755 | B2 | 6/2011 | Davies et al. | 363/35 |
| 8,044,537 | B2 | 10/2011 | Asplund et al. | 307/82 |
| 8,405,251 | B2 | 3/2013 | Barton et al. | 307/84 |
| 8,692,408 | B2 | 4/2014 | Zhang et al. | 307/12 |
| 2006/0097519 | A1* | 5/2006 | Steinke | F03D 9/005 290/44 |
| 2008/0252142 | A1 | 10/2008 | Davies et al. | 307/42 |
| 2009/0146603 | A1 | 6/2009 | Sihler et al. | 318/812 |
| 2009/0212568 | A1* | 8/2009 | Maibach et al. | F03D 9/002 290/44 |
| 2009/0273956 | A1* | 11/2009 | Castelli Dezza et al. | 363/67 |
| 2010/0133816 | A1* | 6/2010 | Abolhassani et al. | H02K 3/28 290/44 |
| 2010/0140939 | A1* | 6/2010 | Scholte-Wassink et al. | F03D 7/0224 290/44 |
| 2010/0292852 | A1 | 11/2010 | Gertmar et al. | 700/287 |
| 2010/0327599 | A1* | 12/2010 | Nielsen et al. | 290/55 |
| 2011/0049994 | A1* | 3/2011 | Hiller et al. | F03D 9/002 307/82 |
| 2012/0101643 | A1 | 4/2012 | Kirchner et al. | 700/287 |
| 2012/0116841 | A1 | 5/2012 | Bippert et al. | 705/7.31 |
| 2012/0136494 | A1 | 5/2012 | Kirchner et al. | 700/287 |
| 2012/0267955 | A1 | 10/2012 | Zhan et al. | 307/31 |

OTHER PUBLICATIONS

*Overview of Multi-MW Wind Turbines and Wind Parks*; Liserre et al.; IEEE Transaction on Industrial Electronics, 2011.

*Medium Voltage Power Conversion Technology for Efficient Windpark Power Collection Grids*; Steimer et al; IEEE International Symposium on Power Electronics for Distributed Generation System; Jun. 2010.

*DC/DC Conversion Systems Consisting of Multiple Converter Modules: Stability, Control and Experimental Verifications*; Chen et al; IEEE Transactions on Power Electronics; vol. 24, No. 6; Jun. 2009.

*Key Components for Future Offshore DC Grids*; Meyer; Institute for Power Electronics and Electrical Drives; RWTH Aachen University; Sep. 2007; ISBN: 978-3-8322-6571-7.

*A Case for Medium Voltage Direct Current (MVDC) Power for Distribution Applications*; Reed et al.; IEEE-PES Power Systems Conference and Exposition; Mar. 23, 2011—Phoenix, AZ; 21 pages of presentation slides.

Notice of Allowance mailed Oct. 6, 2014 in related U.S. Appl. No. 13/363,574.

International Search Report mailed Apr. 25, 2014 in corresponding application No. PCT/US2013/024255.

Written Opinion mailed Apr. 25, 2014 in corresponding application No. PCT/US2013/024255.

European Examination Report (Office Action) mailed Oct. 23, 2015 in corresponding application No. EP 13705315.3.

\* cited by examiner

MEDIUM VOLTAGE DC COLLECTION SYSTEM

TECHNICAL FIELD

Generally, the present invention relates to wind power collection and an associated grid integration scheme for a large-scale offshore wind power plant. In particular, the present invention is directed to a wind power conversion-collection system architecture that facilitates realization of a high range, medium voltage DC collection system. Specifically, the present invention is directed to a multi-phase wind turbine generator and power cell based modular converters to enable medium voltage direct current electrical systems in the range of 20 kV to 50 kV or higher, for offshore wind power plants.

BACKGROUND ART

A typical large-scale offshore wind power plant (sometimes referred to as a wind farm) architecture consists of wind turbines, a medium voltage collection system, an offshore substation, a high voltage transmission system and an onshore substation to interface with the main power grid. Medium voltage AC collection systems, typically 33 kV, are currently used, irrelevant of the type of wind turbine technologies utilized by the wind farm. The choice of transmission system is mainly determined by the distance from the offshore wind power plant to the onshore grid connection point. For close-to-shore wind power plants, high voltage AC (HVAC) transmission systems are used. For offshore wind power plants with long distances to shore, voltage source converter based high voltage DC (VSC-HVDC) systems have proven technically advantageous and cost-effective over conventional HVAC solutions.

In view of system opportunities from wind turbines to the grid connection point, it is possible to improve overall system efficiency and performance by adopting medium voltage DC (MVDC) collection system within the wind power plant. The prerequisite for adopting a MVDC collection system for offshore wind power plant is that medium voltage conversion equipment is used at the generator level, thus allowing elimination of the wind turbine's step-up transformers. Double-feed induction generators have been the prevailing wind generator technology and have dominated the market. However, such technology has become less preferred than other emerging generator technologies such as permanent magnet synchronous generators with full power back-to-back converters due to the fact that the emerging technologies provide better reliability and performance.

As the offshore wind energy infrastructure continues to grow the electrical system in an offshore wind power plant and its connection to the main power grid pose technical challenges with regard to overall system efficiency and performance. The internal wind power collection system of future large offshore wind power plants may be represented by the following electrical characteristics: 400 MW and higher total capacity; increased power of single wind turbines in the range of 5-10 MW; longer distances between turbines, 1,000-1,500 m; maximum distance between two turbines, 10-30 km; and five to eight turbines or 30-40 MW power level, per feeder. As such, there are several technical challenges for medium voltage collection grids. One problem with a typical 33 kV MVAC collection system is low efficiency resulting from higher power loss of wind turbine transformers and AC cables. Increasing collection system voltage from 33 kV to 72 kV can significantly improve efficiency of the collection system. However, this solution may be restricted by the increased dimension of electrical equipment inside the wind turbine tower, such as wind turbine transformers and switchgear. There are also increased demands for high power density and less complexity in wind turbines and offshore platforms.

MVDC collection systems present a promising solution to overcome the aforementioned problems. The main challenge for MVDC solutions for large offshore wind farms is the need for a high range medium voltage electrical system, up to 40-50 kV or higher, without DC/DC power conversion at the wind turbines. Some solutions provide for configuration of a multi-phase wind turbine generator with cascaded AC/DC converters to obtain a higher output voltage. It is known that power cell based modular converters are advantageous for converter-fed generators with reduced stress on generator winding insulations. Therefore, there is a need for a wind power generation and conversion system with multi-phase wind turbine generator and power cell based modular converters to realize an efficient and reliable MVDC electrical system, in the range of 20 kV to 50 kV or higher, for offshore wind power plants. Additionally, there is a need for a wind farm electrical farm architecture with a high range MVDC collection system and high voltage transmission system. In particular, for HVAC-connected offshore wind farms there is a further need for collection system schemes with either DC circuit breakers or AC circuit breakers and the coordination control of DC/AC converters co-located at the offshore or onshore substation.

SUMMARY OF THE INVENTION

In light of the foregoing, it is a first aspect of the present invention to provide a medium voltage DC collection system.

Another aspect of the present invention is to provide a power generation system, comprising at least one generator having at least two sets of stator windings, an active rectifier comprising power cell based modular converters associated with each set of the generator windings, with each set of the windings being connected to an AC voltage side of the associated active rectifier and each active rectifier having a positive DC voltage output and a negative DC voltage output, wherein the DC voltage outputs of active rectifiers are connected to each other in series, a medium voltage DC (MVDC) collection network comprising positive pole cables and negative pole cables, wherein each said positive pole cable is connected to the positive DC voltage output of a first active rectifier and each said negative pole cable is connected to the negative DC voltage output of a last active rectifier, and a substation receiving the negative and positive pole cables of the MVDC collection network for further transformation and transmission of electricity generated by the at least one generator.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
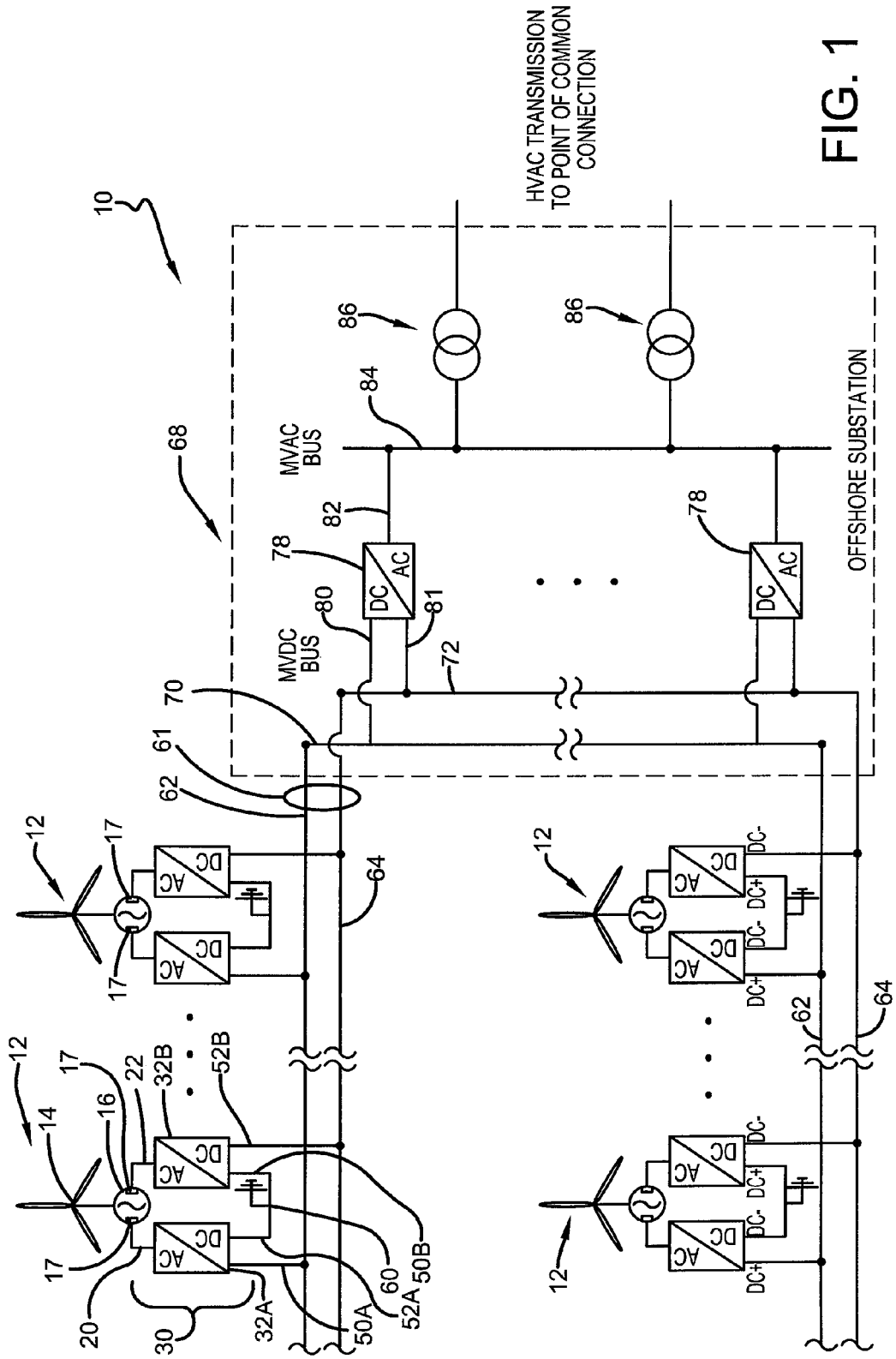
FIG. 1 is a schematic diagram of a wind power generation system made in accordance with the concepts of the present invention.

Referring now to the drawings, and in particular to FIG. 1, it can be seen that a power generation and collection system according to the present invention is designated generally by the numeral 10. Generally, the system 10 supplies power to a power grid for distribution to electric utility customers. Although the system 10 described herein is envisioned for use with an offshore wind power system, skilled artisans will appreciate that it can also be used for an onshore wind power facility, or for other power generation systems wherein individual generators are utilized to accumulate power for transfer to an electrical grid. For example, the systems disclosed herein could be incorporated into tidal energy sources, solar facilities and the like.

The system 10 incorporates wind turbine generators designated generally by the numeral 12. It is envisioned that any number of wind turbine generators could be utilized with the system 10. Each wind turbine generator 12 includes a wind turbine 14 and a multi-phase generator 16. In particular, the generator 16 is configured as a six-phase generator that utilizes dual three-phase stator windings 17. In some embodiments there may be more than two stator windings and the following connections are adjusted accordingly. In any event, the neutral points of the two 3-phase windings are not connected. Moreover, each set of stator windings includes three winding elements that are arranged to minimize the voltage potential between any adjacent winding elements. Accordingly, one three-phase winding 17 provides an output 20 while the other three-phase winding 17 provides an output 22. Each of these outputs 20 and 22 are provided to a rectifier pair designated generally by the numeral 30. In particular, each output is connected to a corresponding rectifier in the rectifier pair 30. Each rectifier pair 30 includes an active rectifier 32A and an active rectifier 32B, wherein each rectifier takes alternating current input from a respective winding (20,22) and generates a direct current output.

Each rectifier 32 utilizes power cell based modular converter topology which provides an almost sinusoidal line-line voltage. As a result, winding insulation based on rated machine voltage is sufficient and the dv/dt filter requirement is minimized. This means that a six-phase generator is provided with a rated voltage of 13.8 kV and the DC output voltage from two cascaded rectifiers can reach above 40 kV.

Figure 1A:
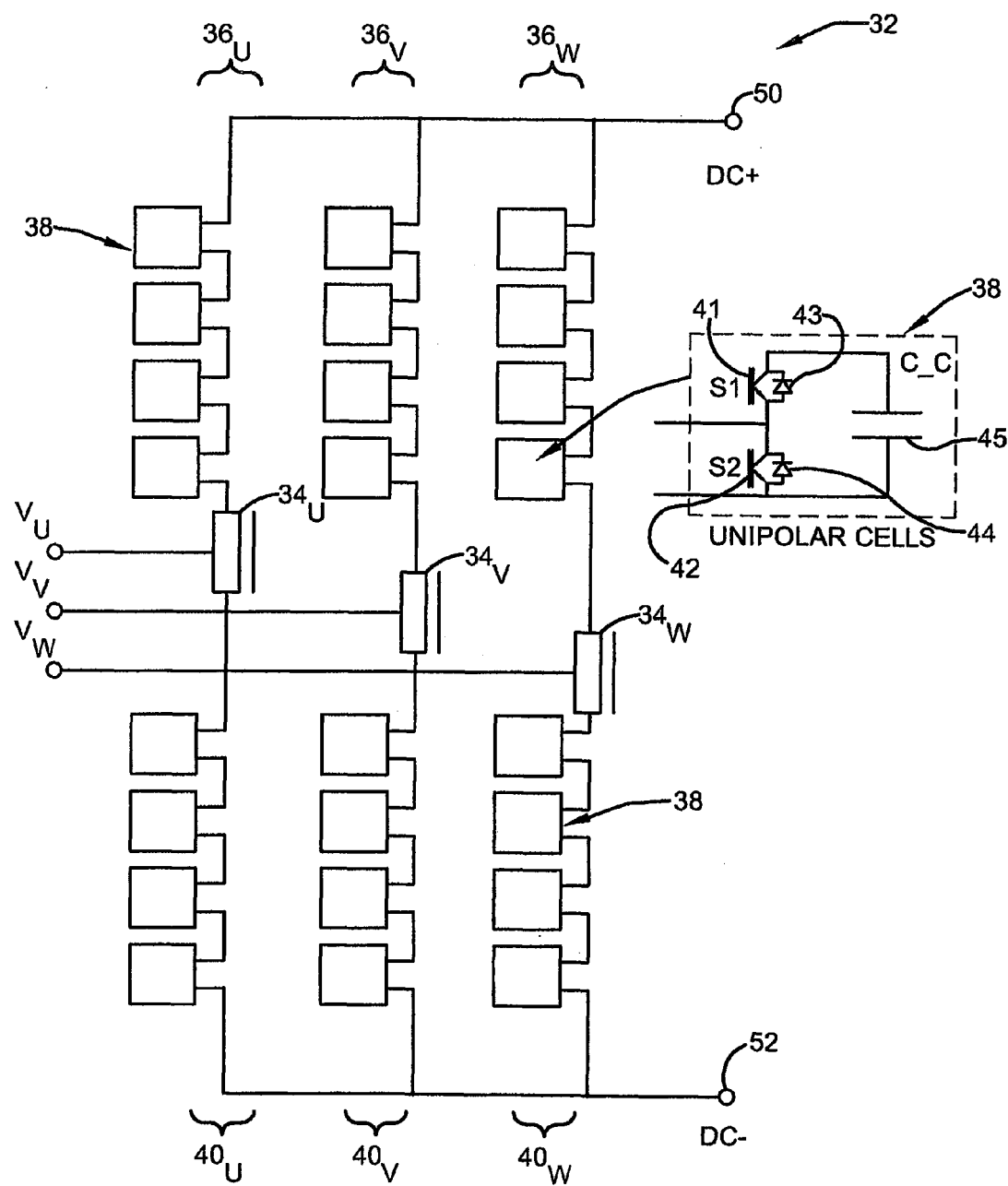
FIG. 1A is a schematic diagram of a rectifier utilized by the wind power generation system made in accordance with the concepts of the present invention.

The rectifier 32, as best seen in FIG. 1A, receives each phase of a three-phase signal, designated in the drawing as $V_u$, $V_v$, and $V_w$ wherein each phase is received by a corresponding distribution circuit 34, which is one leg (including an upper arm and a lower arm) of the power cell based modular converter. Each distribution circuit 34 provides for a positive and a negative output which are connected to a corresponding series of unipolar power cells, which are designated generally by the numerals 36 and 40 with respective subscripts associated with each phase provided.

Each unipolar power cell 38 comprises a two-pole subsystem which has two semiconductor switches 41 and 42, which can be turned off, two diodes 43, 44, and a unipolar energy-storage capacitor 45. As is understood in the art, the two semiconductor switches 41 and 42, which can be turned off, are electrically connected in series, with the series circuit being connected electrically and in parallel with the energy-storage capacitor 45. Each semiconductor switch 41 and 42 is connected electrically and in parallel with one of the two diodes 43 and 44 such that the diode is connected back-to-back and parallel with the corresponding semiconductor switch 41 and 42. The unipolar energy-storage capacitor 45 consists either of a capacitor or of a capacitor bank comprising a plurality of such capacitors, with a resultant capacitance. The connecting point between an emitter of the semiconductor switch 41 and an anode of the diode 43 forms a first connecting terminal of the subsystem for the rectifier 32. The connecting point between the two semiconductor switches 41 and 42 and the two diodes 43 and 44 form a second connecting terminal of the rectifier 32. As such, the collective output of the series of unipolar cells 36 are formed so as to provide a positive DC output 50 from rectifier 32 while the collective output negative series of unipolar cells 40 provide a negative DC output 52 for the rectifier 32.

The active rectifier 32A provides for a positive DC output 50A and a negative DC output 52A. In a corresponding manner, the active rectifier 32B provides for a positive DC output 50B and a negative output 52B. The DC outputs of the active rectifiers are cascaded so as to create a MVDC system with higher voltage level. This is done by connecting the positive output 50A of the rectifier 32A to a positive pole cable 62. The negative output 52B of the active rectifier 32B is connected to a negative pole cable 64. The negative output 52A of the rectifier 32A and the positive output 50B of the rectifier 32B are connected together and grounded at node 60. In embodiments where there are more than two stator windings, the DC voltage outputs of the associated active rectifiers are connected in series. As such, the positive output of the first active rectifier is connected to the positive pole cable and the negative output of the last serially connected rectifier is connected to the negative pole cable.

The generated powers from wind turbine generators are collected by a submarine cable system comprising multiple power collection feeders, each feeder 61 comprising a positive pole cable 62 and a negative pole cable 64. This configuration allows for the collected powers from each wind turbine generator 12 to be aggregated and sent to an offshore substation 68.

The substation 68 includes a positive bus bar 70 and a negative bus bar 72. As such, the positive pole cables 62 are connected to the positive bus bar 70 and the negative bus bar 72 is connected to the negative pole cables 64. The bus bars 70, 72 are then connected to an appropriate number of DC/AC converters or inverters 78. For each inverter 78, a positive DC input 80 is connected to the positive bus bar 70 and a negative DC input 81 is connected to the negative bus bar 72 wherein the inverters 78 output an alternating current output 82 connected to a medium voltage AC (MVAC) bus bar 84. Appropriate number of step-up transformers 86 are connected the MVAC bus bar so that the collected power can be further delivered to the main power grid through HVAC transmission system. It is also feasible in one embodiment to remove the MVAC bus bar 84, thus each step-up transformer 86 may be connected to the AC output of inverter 78.

In summary, the collected powers are aggregated at the common MVDC bus and fed into the high voltage AC transmission system through parallel DC/AC converters and the main transformers. For this conversion process, power call based modular converters as incorporated in the inverters 78 are used. Due to the grid-friendly performance characteristics of such topology, harmonic filter requirements are minimized. The AC output power of inverter 78 is then boosted to high voltage AC transmission system through the aforementioned step-up transformers. With the main DC/AC converters co-located at the offshore substation, it is possible to implement advanced control strategies to enhance the dynamic performance of the wind power plant such as balanced operation of DC/AC converters, reactive power management, fault ride-through improvement, frequency and voltage support to the main power grid.

The main advantage of this embodiment is to provide a practical solution for high range MVDC collection systems for large offshore wind power plants which could be realized with medium voltage power converter technologies. With the main DC/AC converters co-located at the offshore substation, it is possible to achieve improved wind power plant controllability and performance.

Figure 2:
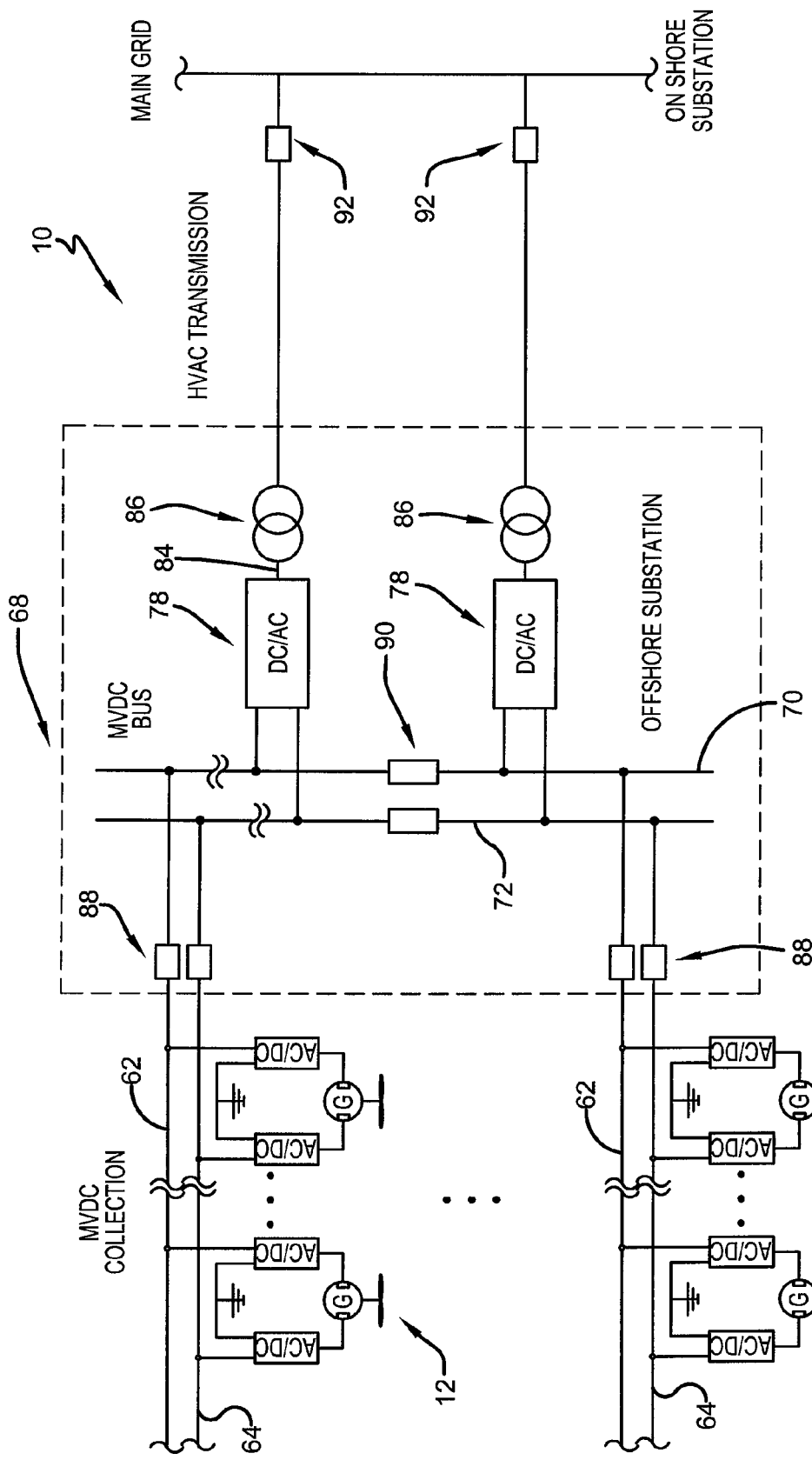
FIG. 2 is an alternative embodiment of the generation system made in accordance with the concepts of the present invention.

Referring now to FIG. 2, it can be seen that an alternate embodiment of the power generation and collection system 10 utilizes MVDC collection and HVAC transmission which may include DC breakers 88 through which positive pole and negative pole power collection cables are connected to the respective bus bars 70 and 72. DC breakers may also be placed at each DC output of wind turbine generator rectifier (not shown). Additionally, DC breakers 90 may be strategically placed in line with the bus bars 70 and 72. Utilizing the breakers 90 allows for split bus operation and fault isolation as needed. Further DC breakers may be placed between the MVDC bus bars and each DC/AC converter. AC breakers 92 may be provided between the offshore substation 68 and the onshore substation.

Figure 3:
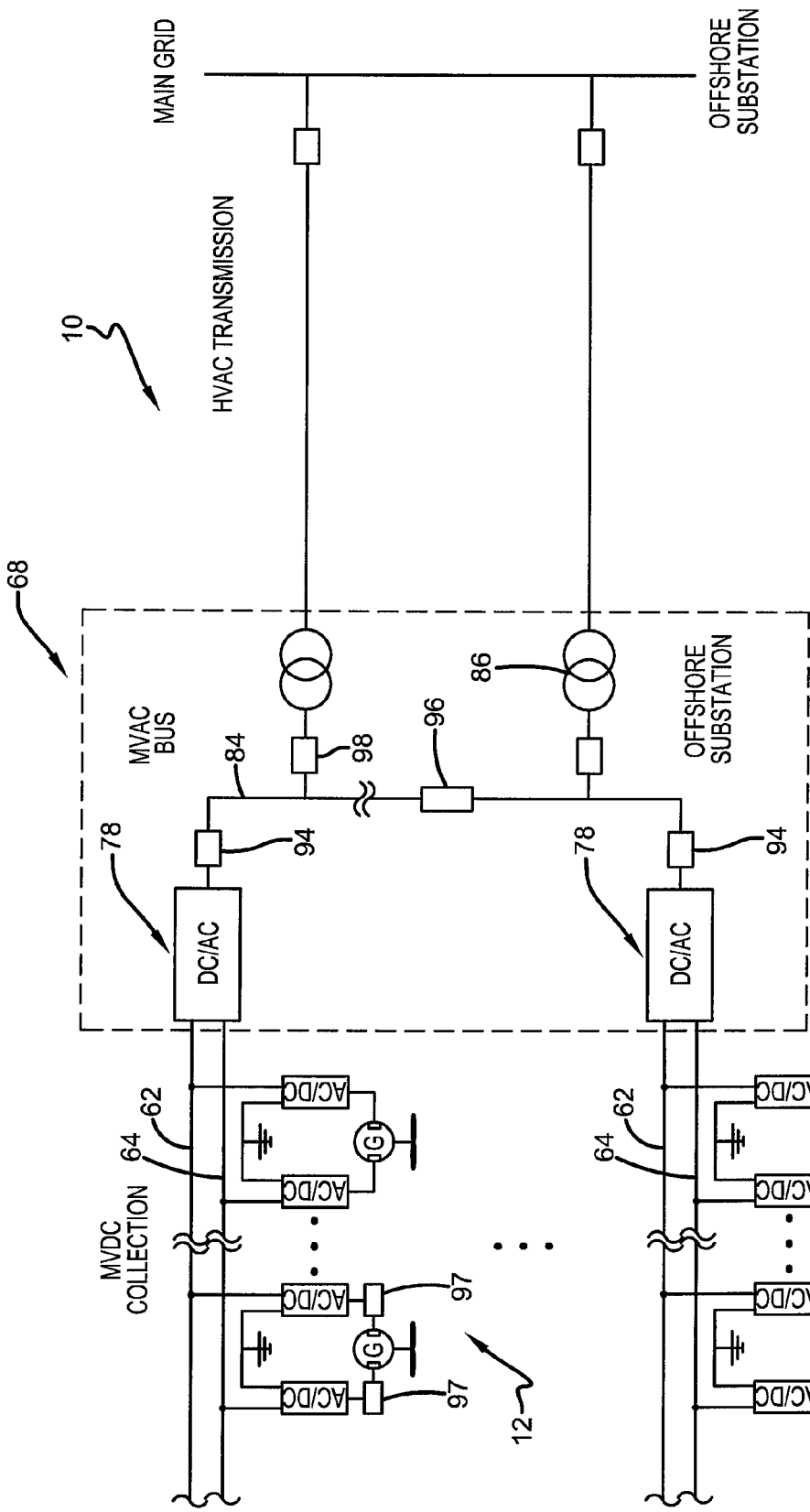
FIG. 3 is yet another embodiment of the wind power generation system made in accordance with the concepts of the present invention.

In yet another embodiment shown in FIG. 3, the power generation and collection system 10 may be configured differently. In particular, each pair of positive pole and negative pole power collection cables are connected the MVAC bus bar 84 through respective DC/AC converters 78 and AC circuit breakers 94. The outputs of the DC/AC converters 78 are connected to AC breakers 94. AC breaker 96 may be strategically placed on MVAC bus bar 84. Utilizing the breaker 96 allows for split bus operation and fault isolation as needed. AC breakers 97 may also be placed at each AC input of wind turbine generator rectifier. Additionally, an AC breaker 98 may be placed between MVAC bus bar 84 and each step-up transformer 86.

Figure 4:
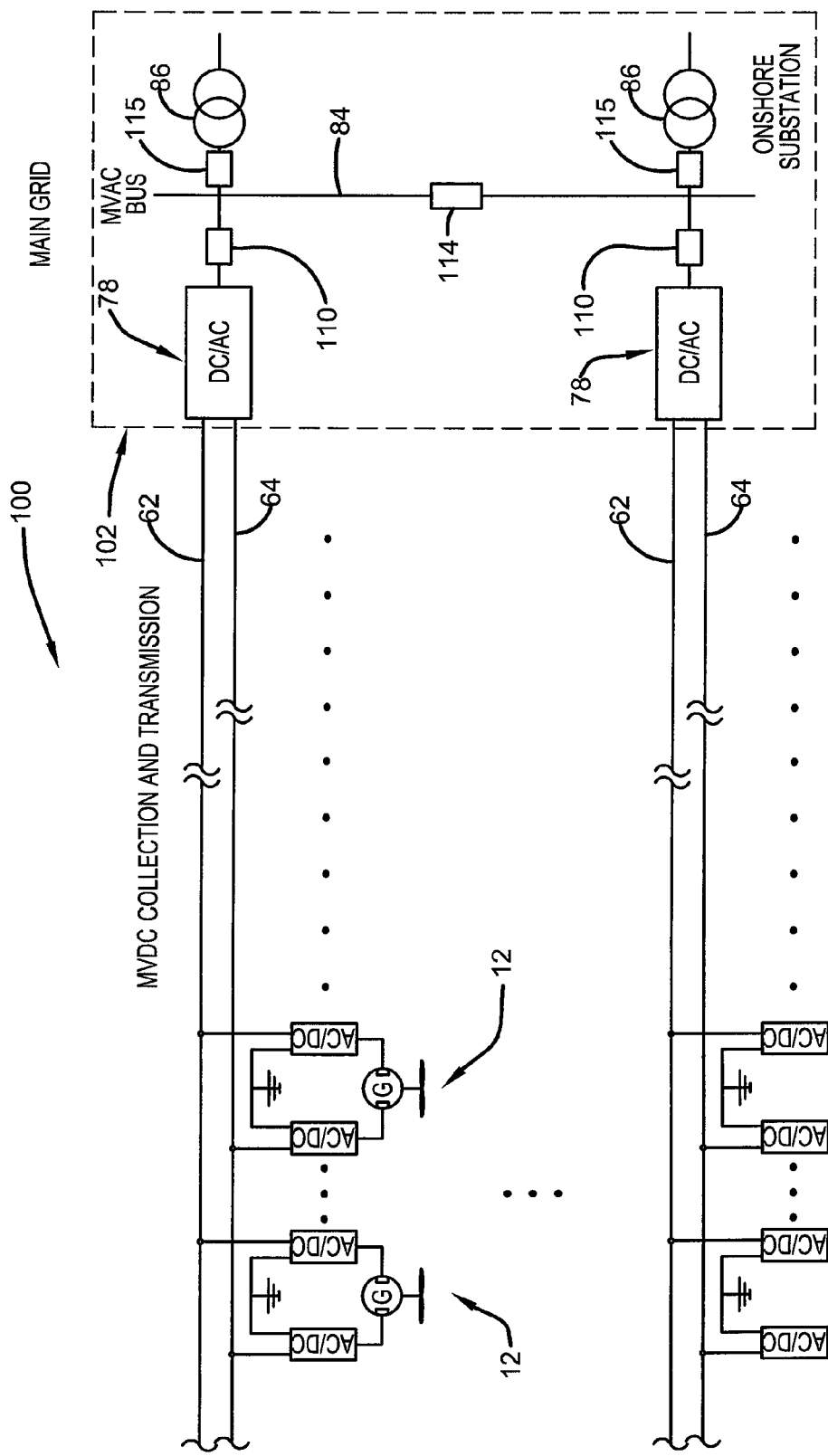
FIG. 4 is still another embodiment of the wind power generation system with connection to an onshore sub-station.

Referring now to FIG. 4, a power generation and collection system designated generally by the numeral 100 and incorporating the concepts presented in FIG. 1 may also be utilized for direct connection to a main grid, thereby eliminating the need for an offshore substation. In particular, the system 100 is configured such that the positive and negative pole power collection cables 62 and 64 from any number of generators 12 are directly fed into the appropriate DC/AC converter 78. In this embodiment, the DC/AC converters 78 are maintained by an onshore substation 102 which is part of the main power grid. The output of the DC/AC converter 78 is connected to AC breaker 110. AC breaker 114 may be strategically placed on the MVAC bus bar 84. Utilizing the breaker 114 allows for split bus operation and fault isolation as needed. Additionally, an AC breaker 115 may be placed between MVAC bus bar 84 and each step-up transformer 86.

Figure 5:
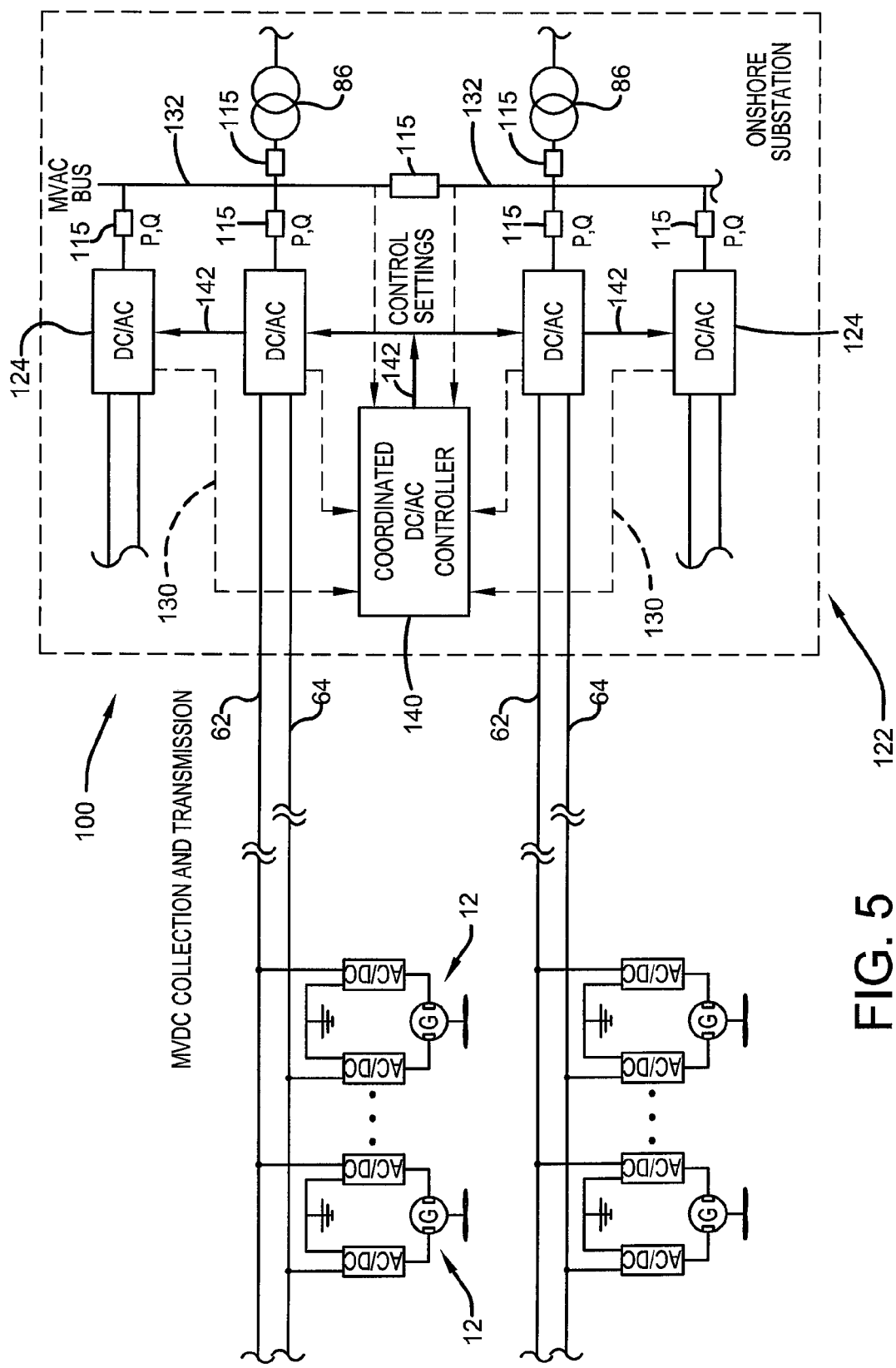
FIG. 5 is another alternative embodiment showing connections of the wind power generation system to an onshore substation with a coordinated DC/AC converter controller.

In yet another embodiment shown in FIG. 5, the power generation and collection system 100 utilizes the wind turbine generators 12 as previously discussed. In this embodiment an onshore substation 122 receives the power generated by the generators 12, wherein each grouping of generators feeds a DC/AC converter 124 as previously discussed. The DC/AC converters 124 deliver real and reactive power (P,Q) to the main power grid. Additionally, each of the converters generates an operational status 130 that is fed into a coordinated DC/AC controller 140. The controller 140 generates control settings which are returned to each of the DC/AC converters. The controller 140 collects data acquisition of the real and reactive power P,Q, current and other parameters from the DC/AC converters, voltage magnitude from the MVAC bus or, in the alternative, an HVAC bus, on/off status of passive shunt devices, such as capacitor banks and reactors. The controller may also be in communication with a system operator. Based upon the received orders from the system operator or utility controller and the local measurements, the controller 140 generates the switching, on/off commands and the DC/AC converter control parameters utilizing built-in control logics and/or algorithms, and sends these control signals to the shunt devices and the DC/AC converters. This permits control of the DC/AC converters as previously disclosed and described. AC breakers 115 may also be provided between the MVAC bus bar 132 and the transformers 86. The breakers 115 may also be used to isolate the converters 124 from one another. AC breakers 115 may also be placed between the MVAC bus and each DC/AC converter.

Under normal system operating conditions, the coordination controller 140 can optimally allocate the required reactive power outputs from the different DC/AC converters based on the loading conditions of the different converters. These parallel converters are not loaded equally because of different wind powers collected from different power collection feeders. If abnormal MVAC bus voltage is detected, all the DC/AC converters can respond automatically to quickly increase or decrease their reactive power outputs according to respective U-Q characteristics and capability limiters.

Skilled artisans will appreciate that the coordinated controller 140 can be implemented on the offshore platform substation shown in FIGS. 2 and 3 respectively. In principle, the control functionality of coordinated controllers for the system shown in FIG. 5 can be quite similar and incorporated into the system shown in FIG. 4. As needed, more functions can be implemented for a controller utilized with the offshore substation shown in FIG. 3. The coordinated controller not only manages reactive power compensation but also controls the power sharing between the parallel DC/AC converters and the energy storage connected at the common MVDC bus.

Based on the foregoing, the advantages of the present invention are readily apparent. The main advantage of this invention is to provide a practical, less complex design of a MVDC electrical system based on multi-phase wind turbine generators and power cell based modular converters. The high range MVDC system is essential for achieving full benefits of MVDC application in offshore wind farms. The proposed MVDC system can be implemented with feasible medium voltage wind turbine generator and converter technologies at reasonable costs. For the MVDC collection system in conjunction with HVAC transmission, the main protection schemes of MVDC system can be implemented by medium voltage DC breakers or by medium voltage AC breakers. With the DC/AC converters co-located at the onshore or offshore substation, it is practical to achieve improved wind power plant controllability and performance through coordinated control of DC/AC converters based on their operating conditions.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A power generation system, comprising:
   at least one generator, each said generator having at least two sets of stator windings;
   an active rectifier comprising power cell based modular converters associated with each set of said stator windings, with each set said windings being connected to an AC voltage side of said associated active rectifier and each said active rectifier having a positive DC voltage output and a negative DC voltage output, wherein said negative DC voltage output of one of said active rectifiers is connected to said positive DC voltage output of another of said active rectifiers;
   a medium voltage DC (MVDC) collection network comprising positive pole cables and negative pole cables, wherein each said positive pole cable is connected to said positive DC voltage output of a first active rectifier and each said negative pole cable is connected to said negative DC voltage output of a last active rectifier; and
   a substation receiving said negative and positive pole cables of said MVDC collection network wherein said substation comprises a plurality of DC/AC converters connected to said positive and negative pole cables of the said MVDC collection network, and said plurality of DC/AC converters converting direct current generated by said at least one generator to alternating current for further transformation and transmission of electricity generated by said at least one generator.

2. The power generation system as claimed in 1, wherein each active rectifier comprises power cell based modular converter topology which has distributed energy storage inside each said power cell.

3. The power generation system as claimed in 1, wherein each set of said stator windings, comprises three winding elements that are arranged to minimize the voltage potential between any adjacent winding elements.

4. The power generation system as claimed in 1, wherein said MVDC collection network comprises multiple feeders, each said feeders connecting to at least one said generator.

5. The system according to claim 1, wherein said substation comprises:
   a MVDC bus system comprising:
      a positive bus bar connected to said positive pole cables of said MVDC collection network;
      a negative bus bar connected to said negative pole cables of said MVDC collection network; and
      said plurality of DC/AC converters connected to said MVDC bus system, said plurality of DC/AC converters converting direct current generated by said at least one generator to alternating current.

6. The system according to claim 5, wherein said substation further comprises:
   at least one step-up transformer connected to an AC voltage side of said plurality of DC/AC converters for further transmission of the electricity generated by said at least one generator.

7. The system according to claim 5, wherein the substation further comprises:
   protective means disposed between said positive and negative bus bars and said negative and positive pole cables of said MVDC collection network, and between said positive and negative bus bars and said plurality of DC/AC converters, and between MVDC bus sections.

8. The system according to claim 1, wherein said substation comprises:
   a MVAC bus bar system connected to said plurality of DC/AC converters.

9. The system according to claim 8, wherein said substation further comprises:
   at least one step-up transformer connected to said MVAC bus bar system for further transmission of the electricity generated by said at least one generator.

10. The system according to claim 8, wherein said substation further comprises:
    protective means disposed between said MVAC bus bar system and said plurality of DC/AC converters, between said MVAC bus bar system and said step-up transformer, and along said MVAC bus bar system.

11. The system according to claim 8, wherein said substation further comprises:
    a DC/AC converter controller;
    said DC/AC converters generating operational status signals received by said DC/AC converter controller which generates control setting signals received by each said DC/AC converter.

12. The system according to claim 5, wherein said substation further comprises:
    a DC/AC converter controller;
    said DC/AC converters generating operational status signals received by said DC/AC converter controller which generates control setting signals received by each said DC/AC converter.

* * * * *